United States Patent

Ogawa

[11] 4,013,350
[45] Mar. 22, 1977

[54] LARGE APERTURE SUPERWIDE-ANGLE LENS

[75] Inventor: Ryota Ogawa, Tokyo, Japan

[73] Assignee: Asahi Kogaku Kogyo Kabushiki Kaisha, Tokyo, Japan

[22] Filed: Aug. 29, 1975

[21] Appl. No.: 608,948

[30] Foreign Application Priority Data

Aug. 29, 1974 Japan .................... 49-99178

[52] U.S. Cl. .................................................. 350/214
[51] Int. Cl.² ...................................... G01B 13/04
[58] Field of Search ..................................... 350/214

[56] References Cited

UNITED STATES PATENTS 3,576,360  4/1971  Shimizu ..................... 350/214
3,924,935  12/1975 Takahashi et al. ............ 350/214

*Primary Examiner*—John K. Corbin
*Assistant Examiner*—Conrad Clark
*Attorney, Agent, or Firm*—Sughrue, Rothwell, Mion, Zinn & Macpeak

[57] ABSTRACT

A miniature and large aperture superwide-angle lens whose aberration is satisfactorily corrected consisting of ten lenses grouped in nine lens components wherein the following conditions (1) to (6) are satisfied:

1. $F/1.25 < |F_{1.2.3.4}| < F$, $F_{1.2.3.4} < 0$
2. $F/0.8 < |F_{1.2.3.4.5.6.7}| < F/0.5$, $F_{1.2.3.4.5.6.7} < 0$
3. $\nu_5 < 30$, $\nu_7 < 27$
4. $2.3F < r_{13} < 3.0F$
5. $1.3F < (d_9 + d_{10} + d_{11} + 22\ d_{12}) < 1.7F$
6. $0.6F < (d_{13} + d_{14} + d_{15} + d_{16} + d_{17} + d_{18}) < 0.8F$

2 Claims, 10 Drawing Figures

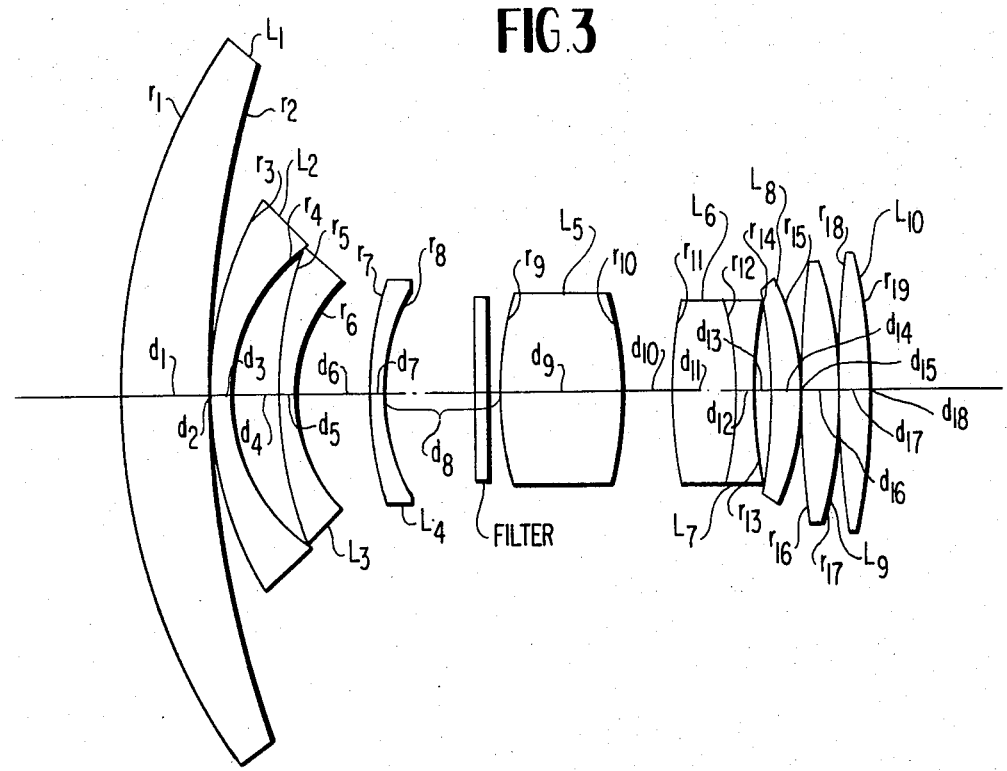
FIG.3
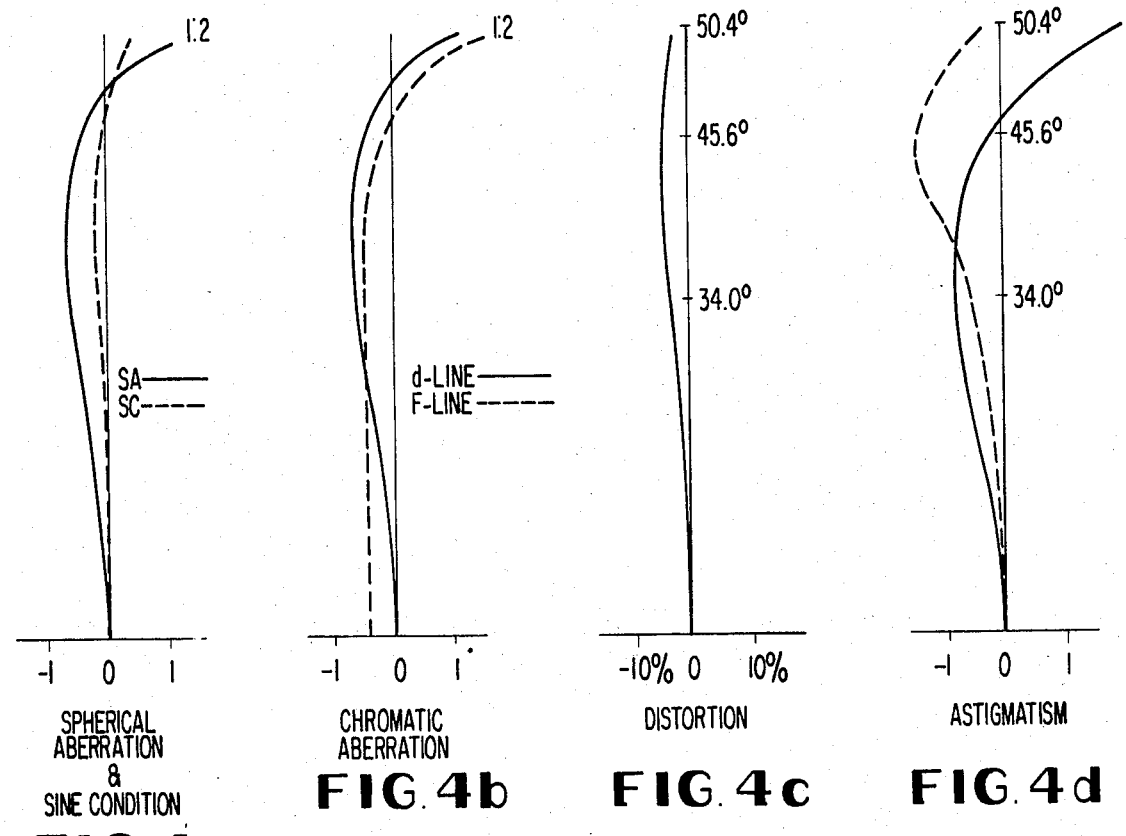
FIG.4a SPHERICAL ABERRATION & SINE CONDITION
FIG.4b CHROMATIC ABERRATION
FIG.4c DISTORTION
FIG.4d ASTIGMATISM

1

LARGE APERTURE SUPERWIDE-ANGLE LENS

SUMMARY OF THE INVENTION

The present invention relates generally to retrofocus superwide-angle lenses, and more particularly to a miniature and large aperture lens which has an extremely large angular field but whose aberrations are satisfactorily corrected. This is accomplished by providing a superwide-angle lens of the retrofocus type consisting of 10 lenses grouped in nine lens components wherein the following conditions (1) to (6) are satisfied:

1. $F/1.25 < |F_{1.2.3.4}| < F$, $F_{1.2.3.4} < 0$
2. $F/0.8 < |F_{1.2.3.4.5.6.7}| < F/0.5$, $F_{1.2.3.4.5.6.7} < 0$
3. $\nu_5 < 30$, $\nu_7 < 27$
4. $2.3F < r_{13} < 3.0F$
5. $1.3F < (d_9 + d_{10} + d_{11} + d_{12}) < 1.7F$
6. $0.6F < (d_{13} + d_{14} + d_{15} + d_{16} + d_{17} + d_{18}) < 0.8F$

BRIEF DESCRIPTION OF THE DRAWINGS

The specific nature of the invention, as well as other objects, aspects, uses and advantages thereof, will clearly appear from the following description and from the accompanying drawings, in which:

FIG. 3 is a longitudinal view showing the lens system in accordance with the second embodiment of the invention; and FIGS. 4a to 4d show aberration curves obtained by the lens system in accordance with the second embodiment of the invention.

DESCRIPTION OF THE PREFERRED EMBODIMENTS

Figure 1:
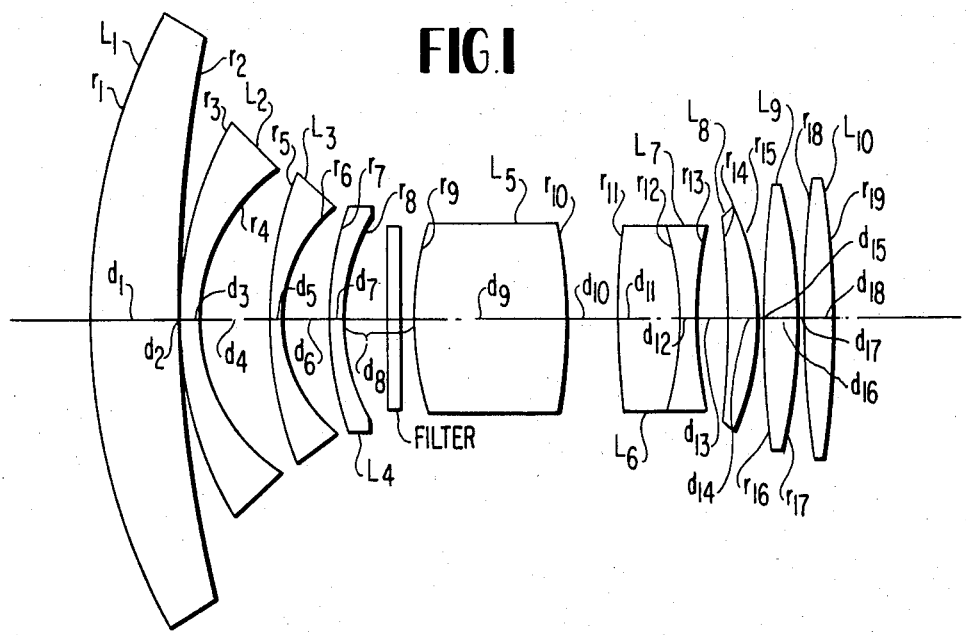
FIG. 1 is a longitudinal view showing the lens system in accordance with the first embodiment of the invention.

A description of construction of the lens system according to the invention will be given first. The superwide-angle lens of the invention comprises ten lenses forming nine elements and consisting of a first convex lens whose surface of greater curvature is directed toward the object, a second negative meniscus lens, a third negative meniscus lens, a fourth negative meniscus lens, said second, third and fourth lenses having their surfaces of greater curvature directed toward the image, a fifth double-convex thick lens, a sixth double-convex lens whose surface of greater curvature is cemented with a seventh double-concave lens, the combination thereof forming a negative lens, an eighth positive meniscus lens whose surface of greater curvature is directed toward the image, a ninth convex lens, and a tenth convex lens, said ninth and tenth lenses having their surfaces of greater curvature directed toward the image. A filter is preferably included between the fourth and fifth lenses, although the filter may be omitted in some cases. The filter is not counted as one of the lenses or elements.

1. $F/1.25 < |F_{1.2.3.4}| < F$, $F_{1.2.3.4} < 0$
2. $F/0.8 < |F_{1.2.3.4.5.6.7}| < F/0.5$, $F_{1.2.3.4.5.6.7} < 0$
3. $\nu_5 < 30$, $\nu_7 < 27$
4. $2.3F < r_{13} < 3.0F$
5. $1.3F < (d_9 + d_{10} + d_{11} + d_{12}) < 1.7F$
6. $0.6F < (d_{13} + d_{14} + d_{15} + d_{16} + d_{17} + d_{18}) < 0.8F$ where $F$ : the focal length in overall system,
$F_i$: the resultant focal length up to the $i$th lens,
$\eta_i$: the refractive index of d-line in the $i$th lens
$\nu_i$: the Abbe number of the $i$th lens,
$d_j$: the thickness of the $j$ lens or the spacing between lenses, and
$r_k$: the radius of curvature of the $k$th lens surface.

The various conditions as described above will be explained in detail in the following:

CONDITION (1)

In this condition, it is natural that the negative focal length in the first half group is defined in a wide-angle retrofocus lens. That is, according to the present invention, when the focal length $F_{1.2.3.4}$ is negative and shorter than $F/1.25$, it may be advantageous for coverage in a wide angle, but aberration produced by the lenses makes it impossible to form a higher aperture. Particularly, as either $r_4$, $r_6$, or $r_8$ becomes smaller, an increasingly worsened inward coma is caused. If $F_{1.2.3.4}$ is longer than $F$, it may be advantageous to some extent in terms of aberration, but a burden must be imposed on the latter group of lenses in order to have the length of backfocus more than as desired, and as a result, the aberration will be worsened. Further, it is difficult to cover the wide angle unless the configuration is made larger.

CONDITION (2)

This condition is provided to define a suitable range of focal length along with the condition (1). In order to maintain better chromatic aberration within the range of the wide angle, it is necessary to introduce a positive lens as the fifth lens, and for the purpose of correcting coma and astigmatism resulting therefrom, a negative lens system, that is, the cemented lens composed of the sixth and seventh lenses is required. If the focal length $F_{1.2.3.4.5.6.7}$ is negative and $|F_{1.2.3.4.5.6.7}|$ is shorter than $F/0.8$, the Petzval sum decreases, but it is difficult to correct the outward coma produced in the 13th lens surface in the range of the wide angle. If the focal length is longer than $F/0.5$, it is necessary to render the positive fifth lens thicker so as to maintain the desired Petzval sum, and it is also necessary to carry out an adequate correction of chromatic aberration, resulting in an increase of burden imposed upon the ninth surface and tenth surface, generation of spherical aberration or the like, and adverse affects on backfocus or the like.

CONDITION (3)

This condition lays stress upon correction of magnification of chromatic aberration. That is, if the Abbe number of each lens is more than the normal value, it is desirable, in order to correct the chromatic aberration while satisfying the condition (2), that the degree of the fifth and seventh lenses is increased within the range of the condition. Otherwise, inadequate correction is provided in the fifth lens while excessive correction is provided in the seventh lens, which is greatly disadvantageous in forming a large aperture lens.

CONDITION (4)

This condition provides a lens to cover a wide angle wherein the backfocus is in the length more than as desired, and coma is balanced. That is, if the radius $r_{13}$ is shorter than $2.3F$, it is advantageous for the backfocus, but it is difficult to maintain a balance of outward coma produced thereat between the range wherein an incident angle is relatively small and the range wherein an incident angle is wide. If it is longer than 3.0F, inward coma produced up to the 10th surface cannot be corrected, and therefore, it would not be adequate for correction of coma over a wide angle of view.

CONDITION (5)

This condition relates to quantities of light, backfocus, and the aberrations of off axis. That is, if the distance $(d_9 + d_{10} + d_{11} + d_{12})$ is in excess of 1.7F, it is advantageous for backfocus, but less light results to produce a condition which is beyond the range of miniaturization. Conversely, if it is less than 1.3F, it is difficult to correct coma in a ray bundle having a relatively small incident angle, while maintaining the balance between the ray bundle greater in the incident level and the ray bundle smaller in the incident level, resulting in a burden on the other portions of the lens making adequate correction of aberration difficult. Further, another method may be considered, wherein the radius of curvature $r_{13}$ is increased to correct the ray of light smaller in the incident level, but it is difficult to correct coma in the range of quantities of peripheral light, which range is not critical for practical use, by a large aperture.

CONDITION (6)

This condition relates to the size of the lens system and distortion. That is, if the distance $(d_{13} + d_{14} + d_{15} + d_{16} + d_{17} + d_{18})$ is less than 0.6F, it will be advantageous to render the whole size of lens system smaller, but the thickness of the eighth, the ninth and tenth lenses must be made smaller, resulting in difficulties of manufacture due to the smaller thickness of these lenses. If it is in excess of 0.8F, the thickness or space of the lens will increase, and when an attempt is made to secure quantities of light more than a certain level in the light flux greater in the degree of incidence, the incidence into the eighth, ninth and tenth lenses increases to produce an excessive negative distortion.

Two specific examples of the present invention will be described herein below.

The first example is shown in FIG. 1 and consists of a convex lens $L_1$, whose surface of greater curvature is directed toward the object, negative meniscus lenses $L_2$, $L_3$ and $L_4$ all having their surfaces of greater curvature directed toward the image (i.e. convex to the object), a filter, a double-convex thick lens $L_5$, a compound lens element comprising a double-convex lens $L_6$ whose surface of greater curvature is cemented with a double-concave lens $L_7$, the combination of lens $L_6$ and lens $L_7$ forming a negative lens, a positive meniscus lens $L_8$ and convex lenses $L_9$ and $L_{10}$, the surface of greater curvature of each of lenses $L_8$, $L_9$ and $L_{10}$ being directed toward the image. The radii of curvature $r_1$ to $r_{19}$ and the lens thicknesses and lens separations $d_1$ to $d_{18}$ along with the refractive indices $\eta_1$ to $\eta_{10}$ and Abbe numbers $\nu_1$ to $\nu_{10}$ for lenses $L_1$ to $L_{10}$ which comprise a wide angle lens having an aperture ratio of 1:2 and an angle of view of 94.6° are given in Table I as follows:

TABLE I

F = 100, aperture ratio 1: 2, Angle of view $2\omega$ = 94.6°
$F_{1.2.3.4} = -87.674$
$F_{1.2.3.4.5.6.7} = -136.712$
Backfocus = 193.146
$\Sigma_p = 0.075$

| Lens L | Radius of Curvature r | Lens Thickness or Spacing d | Refractive Index $\eta$ | Abbe No. $\nu$ |
|---|---|---|---|---|
| $L_1$ | $r_1 = 339.720$ | $d_1 = 49.41$ | $\eta_1 = 1.64000$ | $\nu_1 = 60.2$ |
| | $r_2 = 952.881$ | $d_2 = 0.49$ | | |
| $L_2$ | $r_3 = 218.581$ | $d_3 = 9.95$ | $\eta_2 = 1.74320$ | $\nu_2 = 49.4$ |
| | $r_4 = 93.059$ | $d_4 = 32.61$ | | |
| $L_3$ | $r_5 = 162.580$ | $d_5 = 8.74$ | $\eta_3 = 1.51821$ | $\nu_3 = 65.0$ |
| | $r_6 = 76.282$ | $d_6 = 24.31$ | | |
| $L_4$ | $r_7 = 213.538$ | $d_7 = 8.74$ | $\eta_4 = 1.74320$ | $\nu_4 = 49.4$ |
| | $r_8 = 97.733$ | $d_8 = 26.69$ | | |

(Thickness of filter = 7.28)

| Lens | Radius of Curvature r | Lens Thickness or Spacing d | Refractive Index $\eta$ | Abbe No. $\nu$ |
|---|---|---|---|---|
| $L_5$ | $r_9 = 202.478$ | $d_9 = 81.34$ | $\eta_5 = 1.78470$ | $\nu_5 = 26.2$ |
| | $r_{10} = -272.635$ | $d_{10} = 28.77$ | | |
| $L_6$ | $r_{11} = 857.551$ | $d_{11} = 33.97$ | $\eta_6 = 1.64000$ | $\nu_6 = 60.2$ |
| | $r_{12} = -126.036$ | | | |
| $L_7$ | | $d_{12} = 4.85$ | $\eta_7 = 1.84666$ | $\nu_7 = 23.9$ |
| | $r_{13} = 276.629$ | $d_{13} = 14.56$ | | |
| $L_8$ | $r_{14} = -766.797$ | $d_{14} = 17.62$ | $\eta_8 = 1.51821$ | $\nu_8 = 65.0$ |
| | $r_{15} = -124.736$ | $d_{15} = 0.49$ | | |
| $L_9$ | $r_{16} = 5992.735$ | $d_{16} = 17.96$ | $\eta_9 = 1.74320$ | $\nu_9 = 49.4$ |
| | $r_{17} = -233.291$ | $d_{17} = 0.49$ | | |
| $L_{10}$ | $r_{18} = 5117.276$ | $d_{18} = 13.54$ | $\eta_{10} = 1.69680$ | $\nu_{10} = 55.5$ |
| | $r_{19} = -384.364$ | | | |

TABLE I-continued

F = 100, aperture ratio 1: 2, Angle of view 2ω = 94.6°
$F_{1.2.3.4} = -87.674$
$F_{1.2.3.4.5.6.7} = -136.712$
Backfocus = 193.146
$\Sigma_p = 0.075$

| Lens L | Radius of Curvature r | Lens Thickness or Spacing d | Refractive Index η | Abbe No. ν |
|---|---|---|---|---|

Figures 2A, 2B, 2C, 2D:
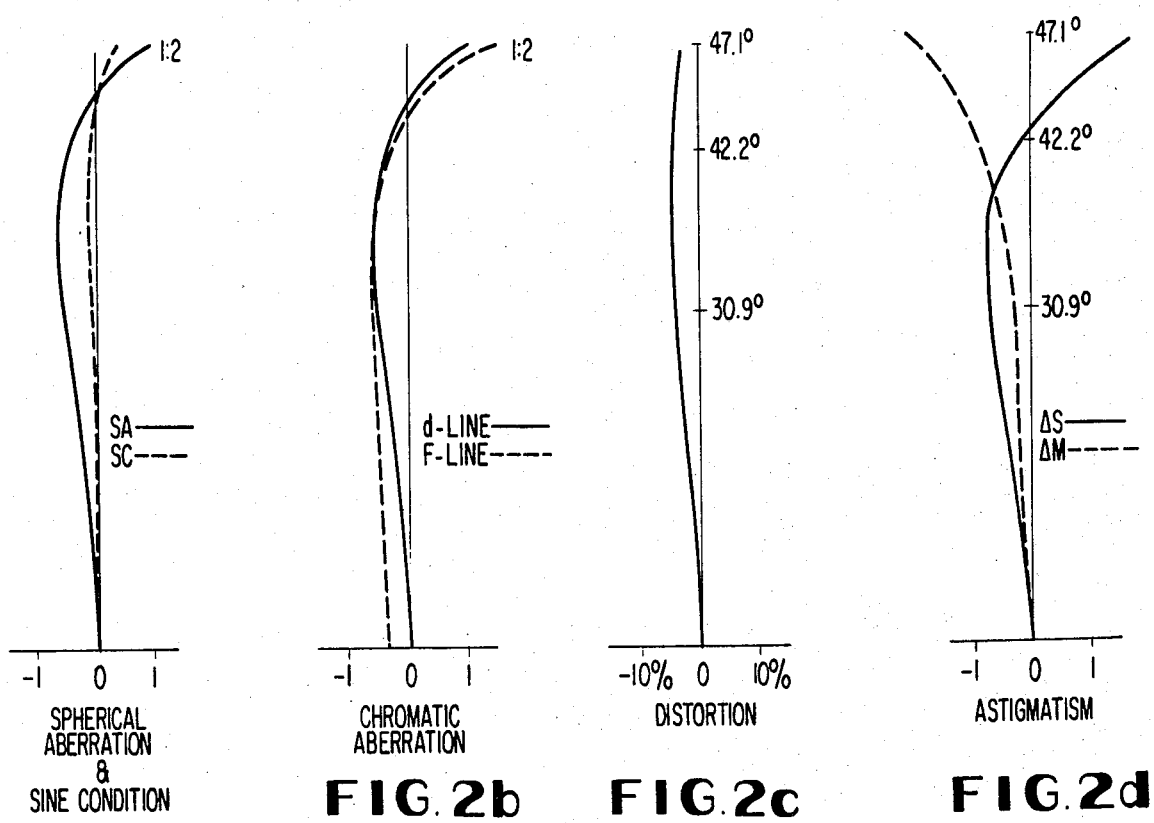
FIGS. 2a to 2d show aberration curves obtained by the lens system in accordance with the first embodiment of the invention.

FIG. 2a shows the spherical aberration and sine condition, FIG. 2b shows the spherical aberration and chromatic aberration, FIG. 2c shows the distortion, and FIG. 2d shows the astigmatism of the wide angle lens shown in FIG. 1 and defined in Table I.

The second example is shown in FIG. 3 and consists of a convex lens $L_1$ whose surface of greater curvature is directed toward the object, negative meniscus lenses $L_2$, $L_3$ and $L_4$ all having their surfaces of greater curvature directed toward the image, a filter, a double convex thick lens $L_5$ a compound lens element comprising a double-convex lens $L_6$ cemented with a double-concave lens $L_7$, a positive meniscus lens $L_8$ and convex lenses $L_9$ and $L_{10}$, the surface of greater curvature of each of lenses $L_8$, $L_9$ and $L_{10}$ being directed toward the image. The radii $r_1$ to $r_{19}$ and the thicknesses and separations $d_1$ to $d_{18}$, along with the refractive indices $\eta_1$ to $\eta_{10}$ and Abbe numbers $\nu_1$ to $\nu_{10}$ for lenses $L_1$ to $L_{10}$ which comprise a wide angle lens having an aperture ratio of 1:2 and an angle of view of 100.8° are given in Table II as follows:

TABLE II

F = 100, aperture ratio 1: 2, Angle of view 2ω = 100.8°
$F_{1.2.3.4} = -87.443$
$F_{1.2.3.4.5.6.7} = -168.492$
Backfocus = 198.906
$\Sigma_p = 0.078$

| Lens L | Radius of Curvature r | Lens Thickness or Spacing d | Refractive Index η | Abbe No. ν |
|---|---|---|---|---|
| $L_1$ | $r_1 = 365.854$ | $d_1 = 46.49$ | $\eta_1 = 1.48749$ | $\nu_1 = 70.1$ |
|  | $r_2 = 1140.959$ | $d_2 = 1.08$ |  |  |
| $L_2$ | $r_3 = 174.465$ | $d_3 = 9.73$ | $\eta_2 = 1.83400$ | $\nu_2 = 37.2$ |
|  | $r_4 = 94.271$ | $d_4 = 36.93$ |  |  |
| $L_3$ | $r_5 = 186.957$ | $d_5 = 8.65$ | $\eta_3 = 1.61800$ | $\nu_3 = 63.4$ |
|  | $r_6 = 91.877$ | $d_6 = 36.07$ |  |  |
| $L_4$ | $r_7 = 236.259$ | $d_7 = 8.65$ | $\eta_4 = 1.61800$ | $\nu_4 = 63.4$ |
|  | $r_8 = 91.949$ | $d_8 = 45.74$ |  |  |
| (Thickness of filter = 8.11) | | | | |
| $L_5$ | $r_9 = 219.886$ | $d_9 = 82.50$ | $\eta_5 = 1.80518$ | $\nu_5 = 25.4$ |
|  | $r_{10} = -253.545$ | $d_{10} = 25.24$ |  |  |
| $L_6$ | $r_{11} = 578.573$ | $d_{11} = 39.79$ | $\eta_6 = 1.64000$ | $\nu_6 = 60.2$ |
|  | $r_{12} = -108.865$ |  |  |  |
| $L_7$ | $r_{13} = 252.722$ | $d_{12} = 6.49$ | $\eta_7 = 1.84666$ | $\nu_7 = 23.9$ |
|  |  | $d_{13} = 10.96$ |  |  |
| $L_8$ | $r_{14} = -479.719$ | $d_{14} = 18.71$ | $\eta_8 = 1.48749$ | $\nu_8 = 70.1$ |
|  | $r_{15} = -123.940$ | $d_{15} = 0.54$ |  |  |
| $L_9$ | $r_{16} = -4178.124$ | $d_{16} = 15.78$ | $\eta_9 = 1.57135$ | $\nu_9 = 52.9$ |
|  | $r_{17} = -206.188$ | $d_{17} = 1.08$ |  |  |
| $L_{10}$ | $r_{18} = 540.043$ | $d_{18} = 16.44$ | $\eta_{10} = 1.53172$ | $\nu_{10} = 48.9$ |
|  | $r_{19} = -468.648$ |  |  |  |

FIG. 4a shows the spherical aberration and sine condition, FIG. 4b shows the spherical aberration and chromatic aberration, FIG. 4c shows the distortion of FIG. 4d shows the astigmatism of the wide angle lens shown in FIG. 3 and defined in Table II.

It will be apparent that the embodiments shown are only exemplary and that various modifications can be made in construction and arrangement within the scope of the invention as defined in the appended Claims.

I claim:

1. A miniature and large aperture superwide-angle lens of the retrofocus type comprising ten lenses grouped in nine components wherein the first lens is a convex lens whose surface of greater curvature is convex to the object, the second lens is a negative meniscus lens, the third lens is a negative meniscus lens, and the fourth lens is a negative meniscus lens, said second, third and fourth lenses being concave to the image, the fifth lens is a double-convex lens, the sixth and seventh lenses constitute a cemented doublet, said sixth lens being a double-convex lens whose surface of greater curvature is cemented with said seventh lens, said seventh lens being a double-concave lens, the combination of said sixth and seventh lenses forming a negative lens, the eighth lens is a positive meniscus lens whose surface of greater curvature is convex to the image, the ninth lens is a convex lens, and the tenth lens is a convex lens, said ninth and tenth lenses having their surfaces of greater curvature convex to the image, and a filter located between said fourth and fifth lenses, wherein the radii of curvature $r_1$ to $r_{19}$, the lens thicknesses and lens separations $d_1$ to $d_{18}$, the refractive indices $\eta_1$ to $\eta_{10}$, and Abbe numbers $\nu_1$ to $\nu_{13}$ of said first to tenth lenses $L_1$ to $L_{10}$, respectively, satisfy the following conditions:

F = 100, aperture ratio 1:2, Angle of view $2\omega = 94.6°$
$F_{1.2.3.4} = -87.674$
$F_{1.2.3.4.5.6.7} = -136.712$
Backfocus = 193.146
$\Sigma_\rho = 0.075$

| Lens L | Radius of Curvature r | Lens Thickness or Spacing d | Refractive Index $\eta$ | Abbe No. $\nu$ |
|---|---|---|---|---|
| $L_1$ | $r_1 = 339.720$ | $d_1 = 49.41$ | $\eta_1 = 1.64000$ | $\nu_1 = 60.2$ |
|  | $r_2 = 952.881$ | $d_2 = 0.49$ |  |  |
| $L_2$ | $r_3 = 218.581$ | $d_3 = 9.95$ | $\eta_3 = 1.74320$ | $\nu_2 = 49.4$ |
|  | $r_4 = 93.059$ | $d_4 = 32.61$ |  |  |
| $L_3$ | $r_5 = 162.580$ | $d_5 = 8.74$ | $\eta_3 = 1.51821$ | $\nu_3 = 65.0$ |
|  | $r_6 = 76.282$ | $d_6 = 24.31$ |  |  |
| $L_4$ | $r_7 = 213.538$ | $d_7 = 8.74$ | $\eta_4 = 1.74320$ | $\nu_4 = 49.4$ |
|  | $r_8 = 97.733$ | $d_8 = 26.69$ |  |  |

(Thickness of filter = 7.28)

| Lens L | Radius of Curvature r | Lens Thickness or Spacing d | Refractive Index $\eta$ | Abbe No. $\nu$ |
|---|---|---|---|---|
| $L_5$ | $r_9 = 202.478$ | $d_9 = 81.34$ | $\eta_5 = 1.78470$ | $\nu_5 = 26.2$ |
|  | $r_{10} = -272.635$ | $d_{10} = 28.77$ |  |  |
| $L_6$ | $r_{11} = 857.551$ | $d_{11} = 33.97$ | $\eta_6 = 1.64000$ | $\nu_6 = 60.2$ |
| $L_7$ | $r_{12} = -126.036$ | $d_{12} = 4.85$ | $\eta_7 = 1.84666$ | $\nu_7 = 23.9$ |
|  | $r_{13} = 276.629$ | $d_{13} = 14.56$ |  |  |
| $L_8$ | $r_{14} = -766.797$ | $d_{14} = 17.62$ | $\eta_8 = 1.51821$ | $\nu_8 = 65.0$ |
|  | $r_{15} = -124.736$ | $d_{15} = 0.49$ |  |  |
| $L_9$ | $r_{16} = 5992.735$ | $d_{16} = 17.96$ | $\eta_9 = 1.74320$ | $\nu_9 = 49.4$ |
|  | $r_{17} = -233.291$ | $d_{17} = 0.49$ |  |  |
| $L_{10}$ | $r_{18} = -5117.276$ | $d_{18} = 13.54$ | $\eta_{10} = 1.69680$ | $\nu_{10} = 55.5$ |
|  | $r_{19} = -384.364$ |  |  |  |

2. A miniature and large aperture superwide-angle lens of the retrofocus type comprising ten lenses grouped in nine components wherein the first lens is a convex lens whose surface of greater curvature is convex to the object, the second lens is a negative meniscus lens, the third lens is a negative meniscus lens, and the fourth lens is a negative meniscus lens, said second, third fourth lenses being concave to the image, the fifth lens is a double-convex lens, the sixth and seventh lenses constitute a cemented doublet, said sixth lens being a double-convex lens whose surface of greater curvature is cemented with said seventh lens, said seventh lens being a double-concave lens, the combination of said sixth and seventh lenses forming a negative lens, the eighth lens is a positive meniscus lens whose surface of greater curvature is convex to the image, the ninth lens is a convex lens, and the tenth lens is a convex lens, said ninth and tenth lenses having their surfaces of greater curvature convex to the image, and a filter located between said fourth and fifth lenses, wherein the radii of curvature $r_1$ to $r_{19}$, the lens thicknesses and the lens separations $d_1$ to $d_{18}$, the refractive indices $\eta_1$ to $\eta_{10}$, and Abbe numbers $\nu_1$ to $\nu_{10}$ of said first to tenth lenses $L_1$ to $L_{10}$, respectively, satisfy the following conditions:

F = 100, aperture ratio 1:2, Angle of view $2\omega = 100.8°$
$F_{1.2.3.4} = -87.443$
$F_{1.2.3.4.5.6.7} = -168.492$
Backfocus = 198.906
$\Sigma_\rho = 0.078$

| Lens L | Radius of Curvature r | Lens Thickness or Spacing d | Refractive Index $\eta$ | Abbe No. $\nu$ |
|---|---|---|---|---|
| $L_1$ | $r_1 = 365.854$ | $d_1 = 46.49$ | $\eta_1 = 1.48749$ | $\nu_1 = 70.1$ |
|  | $r_2 = 1140.959$ | $d_2 = 1.08$ |  |  |
| $L_2$ | $r_3 = 174.465$ | $d_3 = 9.73$ | $\eta_2 = 1.83400$ | $\nu_2 = 37.2$ |
|  | $r_4 = 94.271$ | $d_4 = 36.93$ |  |  |
| $L_3$ | $r_5 = 186.957$ | $d_5 = 8.65$ | $\eta_3 = 1.61800$ | $\nu_3 = 63.4$ |
|  | $r_6 = 91.877$ | $d_6 = 36.07$ |  |  |
| $L_4$ | $r_7 = 236.259$ | $d_7 = 8.65$ | $\eta_4 = 1.61800$ | $\nu_4 = 63.4$ |
|  | $r_8 = 91.949$ | $d_8 = 45.74$ |  |  |

(Thickness of filter = 8.11)

| Lens L | Radius of Curvature r | Lens Thickness or Spacing d | Refractive Index $\eta$ | Abbe No. $\nu$ |
|---|---|---|---|---|
| $L_5$ | $r_9 = 219.886$ | $d_9 = 82.50$ | $\eta_5 = 1.80518$ | $\nu_5 = 25.4$ |

-continued

| Lens L | Radius of Curvature r | Lens Thickness or Spacing d | Refractive Index $\eta$ | Abbe No. $\nu$ |
|---|---|---|---|---|
| | $r_{10} = -253.545$ | $d_{10} = 25.24$ | | |
| $L_6$ | $r_{11} = 578.573$ | $d_{11} = 39.79$ | $\eta_6 = 1.64000$ | $\nu_6 = 60.2$ |
| $L_7$ | $r_{12} = -108.865$ | $d_{12} = 6.49$ | $\eta_7 = 1.84666$ | $\nu_7 = 23.9$ |
| | $r_{13} = 252.722$ | $d_{13} = 10.96$ | | |
| $L_8$ | $r_{14} = -479.719$ | $d_{14} = 18.71$ | $\eta_8 = 1.48749$ | $\nu_8 = 70.1$ |
| | $r_{15} = -123.940$ | $d_{15} = 0.54$ | | |
| $L_9$ | $r_{16} = -4178.124$ | $d_{16} = 15.78$ | $\eta_9 = 1.57135$ | $\nu_9 = 52.9$ |
| | $r_{17} = -206.188$ | $d_{17} = 1.08$ | | |
| $L_{10}$ | $r_{18} = 540.043$ | $d_{18} = 16.44$ | $\eta_{10} = 1.53172$ | $\nu_{10} = 48.9$ |
| | $r_{19} = -468.648$ | | | |

* * * * *